United States Patent [19]

Rakocy et al.

[11] Patent Number: 5,997,674
[45] Date of Patent: Dec. 7, 1999

[54] AIR PURIFIER AND METHOD OF MANUFACTURE

[75] Inventors: William Rakocy, Madison, Conn.; Johnson Hsu, Framingham; Neville R. Glenn, Milford, both of Mass.

[73] Assignee: Holmes Products Corp., Milford, Mass.

[21] Appl. No.: 09/206,083

[22] Filed: Dec. 4, 1998

Related U.S. Application Data

[62] Division of application No. 08/989,196, Dec. 11, 1997, Pat. No. 5,893,939.

[51] Int. Cl.[6] .................................................. B01D 46/52
[52] U.S. Cl. ............................. 156/196; 156/292; 55/502
[58] Field of Search .................................. 156/196, 292; 55/497, 500, 502

[56] References Cited

U.S. PATENT DOCUMENTS

| | | |
|---|---|---|
| 3,871,847 | 3/1975 | Fish . |
| 3,928,008 | 12/1975 | Petersen . |
| 4,629,482 | 12/1986 | Davis . |
| 4,737,173 | 4/1988 | Kudirka et al. . |
| 4,778,496 | 10/1988 | Conrad . |
| 5,078,764 | 1/1992 | Lutterbach et al. . |
| 5,102,435 | 4/1992 | Rau et al. . |
| 5,131,932 | 7/1992 | Glucksman . |
| 5,230,723 | 7/1993 | Travis et al. . |
| 5,259,854 | 11/1993 | Newman . |
| 5,266,090 | 11/1993 | Burnett . |
| 5,290,330 | 3/1994 | Tepper et al. . |
| 5,435,817 | 7/1995 | Davis et al. . |
| 5,512,086 | 4/1996 | Glucksman ............................. 55/502 |
| 5,529,593 | 6/1996 | Simmons . |
| 5,660,605 | 8/1997 | Chan et al. . |

*Primary Examiner*—Daniel Stemmer
*Attorney, Agent, or Firm*—Hoffmann & Baron, LLP; Francis E. Marino

[57] ABSTRACT

An air purifier, an air filter and a method of manufacturing an air filter for an air purifier are provided. The air purifier includes a base assembly, a filter assembly and a grill. A fan is mounted to the base assembly, and draws air through the filter assembly. The base and filter assemblies include adjoining walls having openings which are substantially smaller in area than the areas of the adjoining walls and area through which air is drawn in through the filter assembly. A resilient gasket having a passage approximately the size of these openings is positioned between the adjoining walls. The filter assembly is drawn towards the base assembly when the fan is operated, thereby enhancing the seal formed by the gasket against the adjoining walls. Unfiltered air is accordingly unlikely to bypass the filter assembly. The air filter is manufactured in an efficient manner through the use of a back plate having oblique end portions. A pleated HEPA filter is positioned in a U-shaped configuration and the ends thereof adhered to the oblique end portions. Top and bottom walls are then applied to the resulting structure.

3 Claims, 13 Drawing Sheets

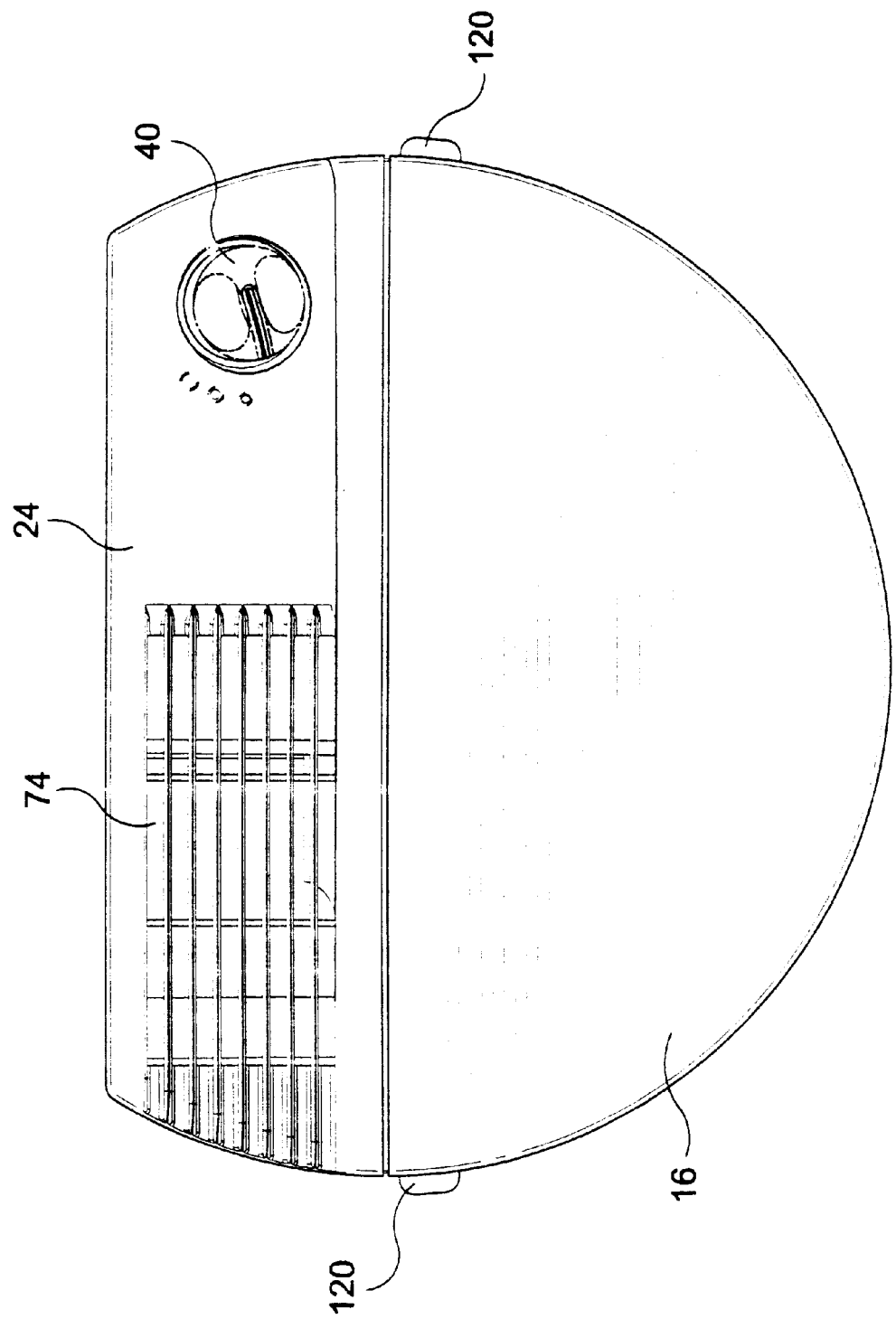

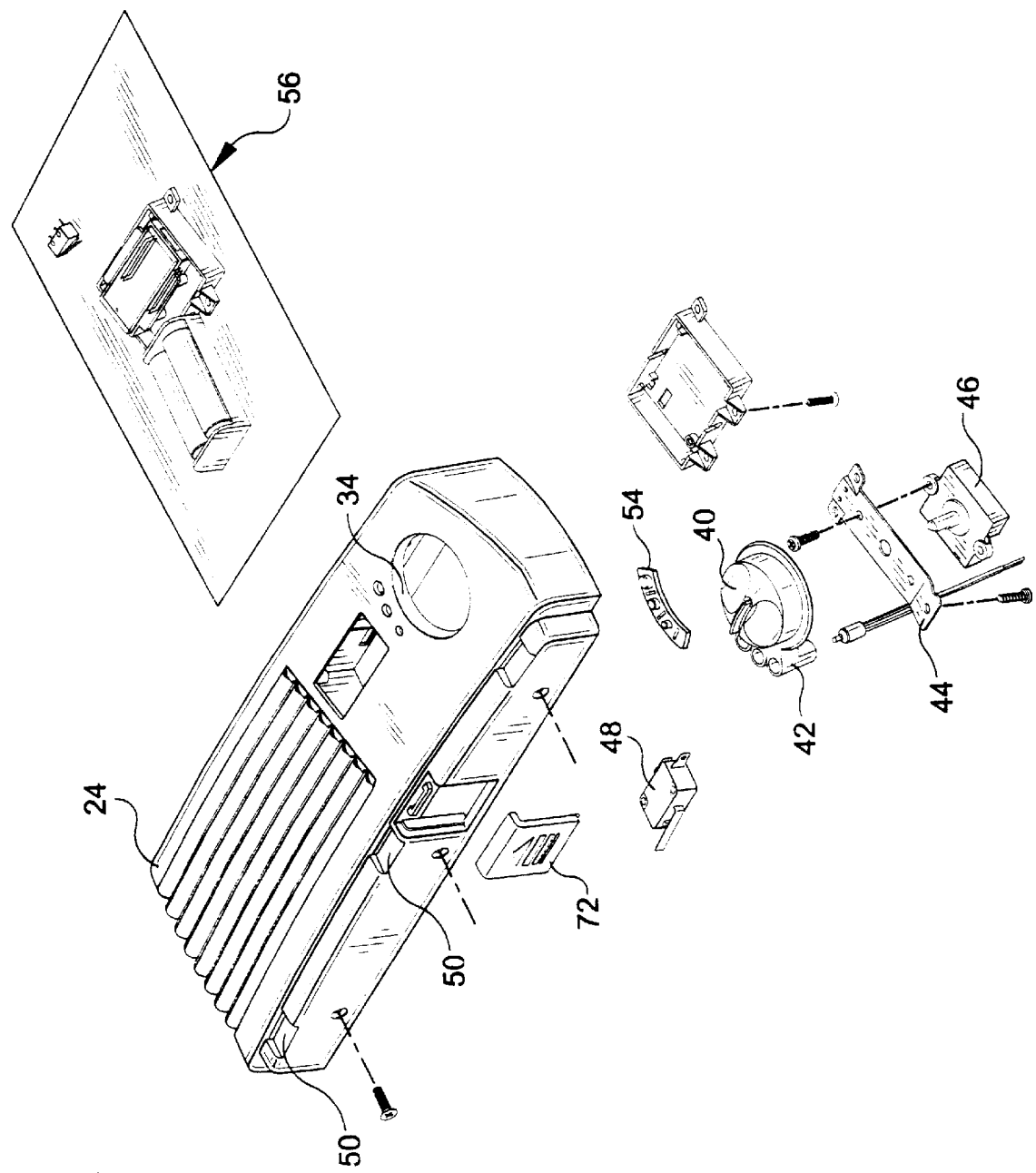

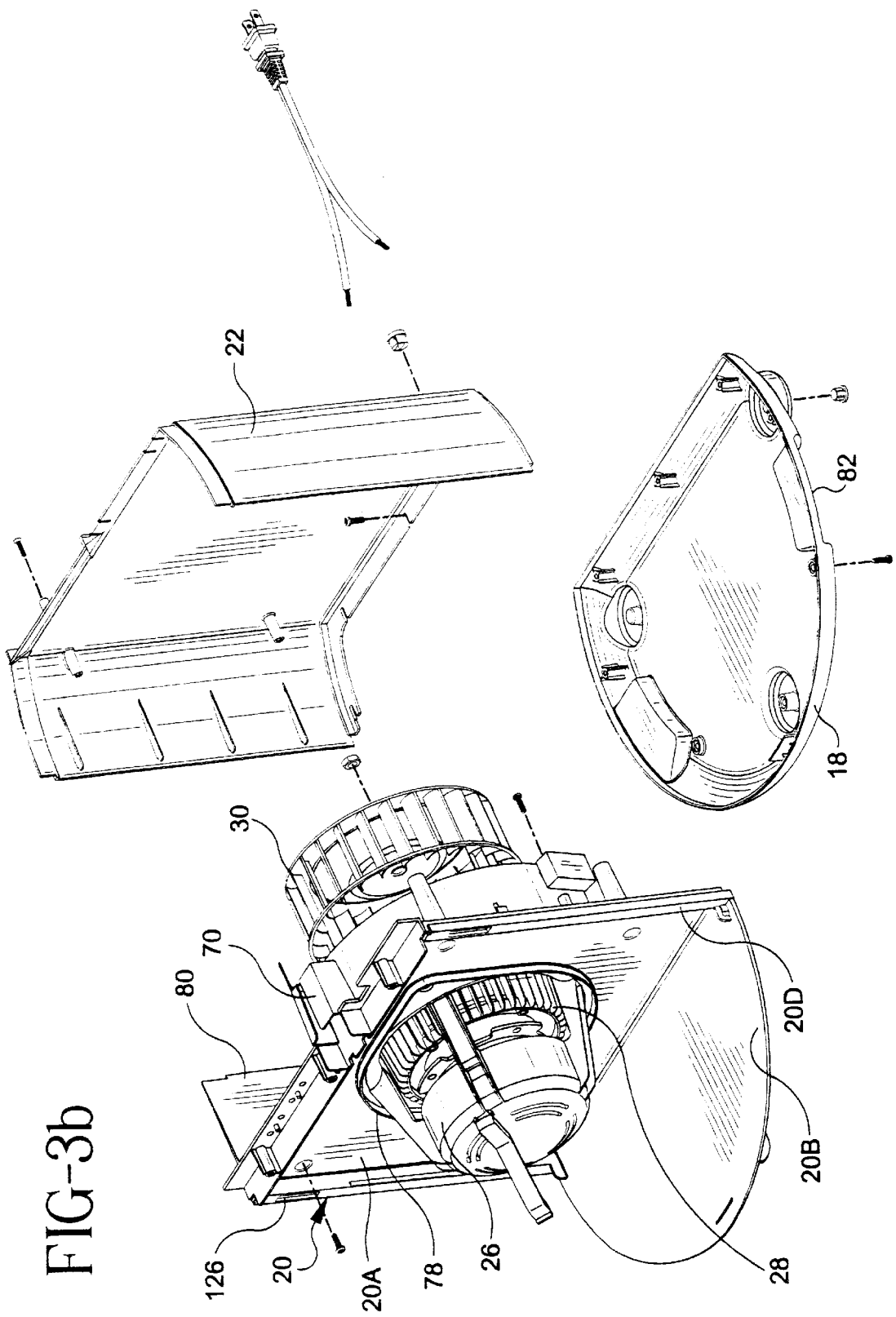

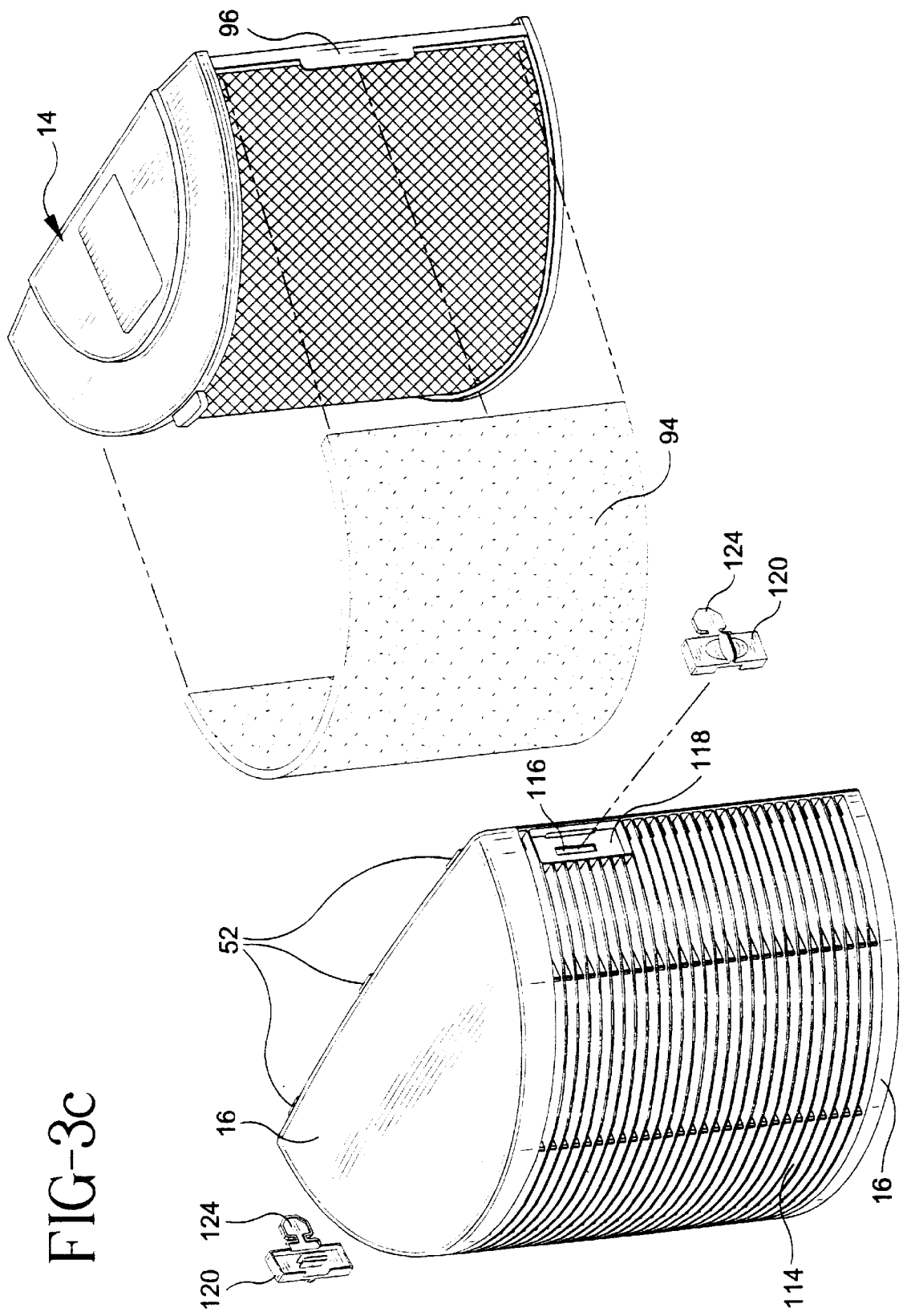

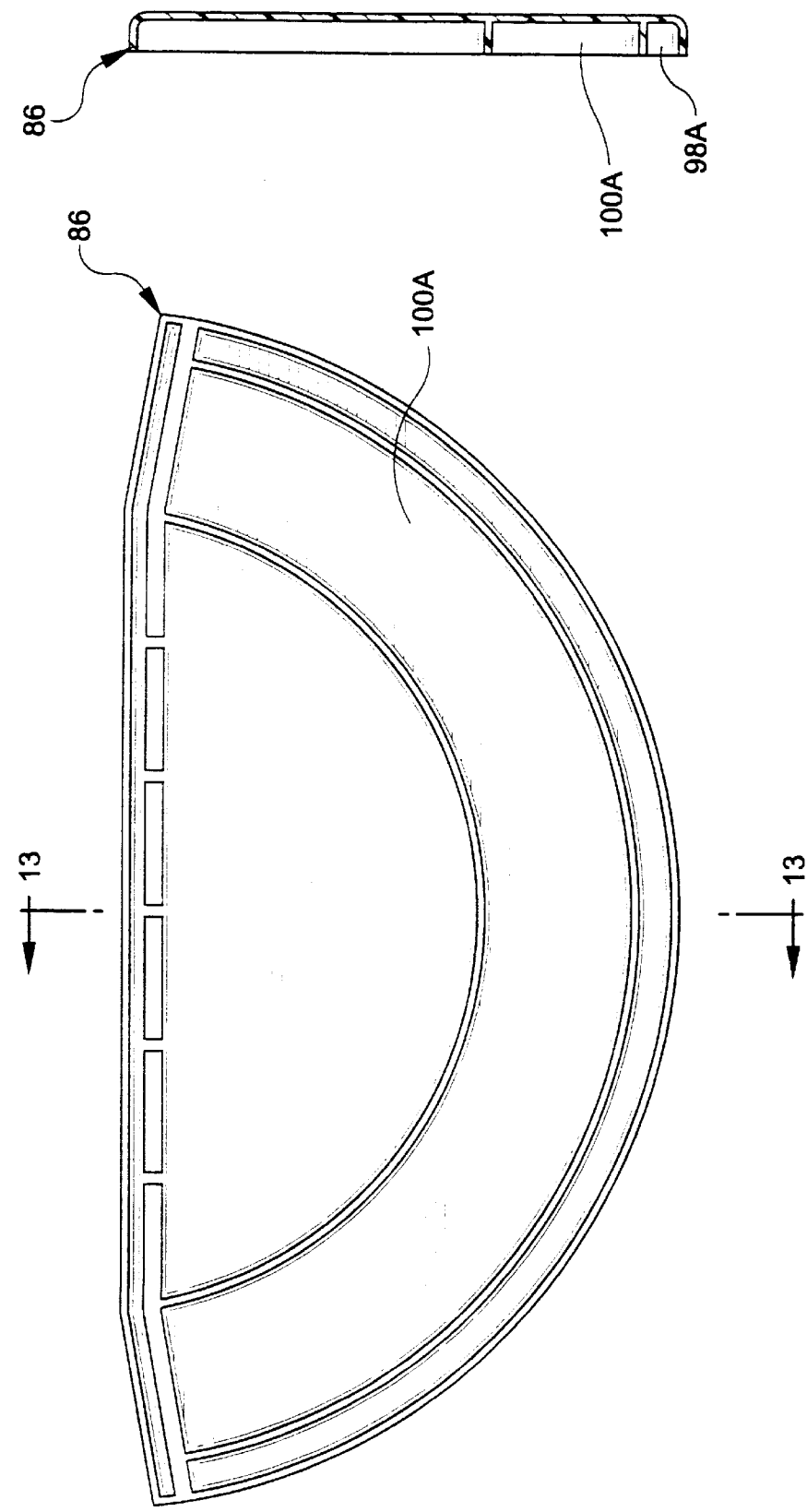

AIR PURIFIER AND METHOD OF MANUFACTURE

This application is a divisional of application Ser. No. 08/989,196, filed of Dec. 11, 1997, now U.S. Pat. No. 5,893,939.

BACKGROUND OF THE INVENTION

1. Field of the Invention

The field of the invention relates to air purifiers, particularly to portable air purifiers including HEPA filters, and methods of manufacture of air filters therefor.

2. Brief Description of the Prior Art

Portable air purifiers for removing airborne particles are used in many homes and offices. Such purifiers often include a fine particle high efficiency particulate air (HEPA) filter. In addition to a HEPA filter, some purifiers include a carbon filter to remove odors. The carbon may be incorporated within a fibrous matrix. A filter for trapping relatively large particulates may also be found in portable air purifiers. In operation, one or more fans cause air to be drawn through the filter(s) and emitted through an outlet.

HEPA filters have gained increasing acceptance for use in purifiers directed to consumers as they remove 99.97% of particulates having a size equal to or greater than 0.3 microns. In order to take full advantage of a HEPA filter or any other type of filter used in an air purifier, it is important to ensure that substantially all of the air emitted by the air purifier has indeed first passed through the filter(s) provided in the purifier.

As the filter(s) employed in air purifiers require replacement when spent, the ability to easily remove and replace the filter(s) is important. A replaced filter must be properly installed if it is to function properly. Disposable filter assemblies have accordingly been designed to facilitate user convenience.

A number of patents have issued which disclose air purifiers including HEPA filters, carbon filters, and/or other filters. U.S. Pat. Nos. 3,928,008; 4,629,482; 4,737,173; 4,778,496; 5,078,764; 5,102,435; 5,131,932; 5,230,723; 5,259,854; 5,290,330; and 5,512,086 disclose air purifiers of various constructions.

SUMMARY OF THE INVENTION

An air purifier is provided for removing airborne particulates. The purifier includes a base assembly including at least one substantially vertical wall and a first enclosure adjoining the substantially vertical wall. The first enclosure includes a first opening extending through the substantially vertical wall and a second opening. A fan is mounted to the base assembly and is capable of drawing air into the first enclosure through the first opening and blowing air out of the first enclosure through the second opening. Means are provided for driving the fan. Such means preferably include an electric motor mounted to the base assembly. The fan is preferably positioned within the first enclosure. A filter assembly is detachably mounted to the base assembly. The filter assembly includes a substantially vertical back plate adjoining the substantially vertical wall of the base assembly, and an opening extending through the back plate and aligned with the first opening and substantially smaller in dimensions than the dimensions of said back plate. A second enclosure adjoins the substantially vertical back plate. The second enclosure includes a wall substantially defined by a filter capable of filtering airborne particles. A compressible resilient gasket adjoins the substantially vertical wall of the base assembly and the back plate. The gasket includes a generally central passage about the same size as the opening in the back plate and aligned with the first opening. The relative sizes of the openings in the back plate and vertical wall and the air intake portion of the filter assembly cause the filter assembly to be drawn with considerable force towards the base assembly. The gasket, being compressed between these two assemblies when the fan is operated, provides a reliable seal which substantially prevents unfiltered air from bypassing the filter assembly.

A filter assembly for an air purifier is also provided in accordance with the invention. The filter assembly includes a generally rectangular back plate having an opening extending therethrough. The opening has substantially smaller dimensions than the dimensions of the back plate. A compressible, resilient gasket is secured to the back plate. The gasket includes a generally central passage about the same size as the opening in the back plate. A generally semicircular top wall is mounted to the back plate and extends substantially perpendicularly therefrom. A generally semicircular bottom wall is also mounted to the back plate and extends substantially perpendicularly therefrom, and is in opposing relation to the top wall. A generally semicylindrical, pleated HEPA filter has first and second ends which adjoin the back plate and top and bottom portions which adjoin the top and bottom walls, respectively. The back plate preferably includes a central portion to which the gasket is secured, and a pair of end portions. Each of the end portions preferably includes an inner surface extending at an oblique angle with respect to the plane of the inner surface of the central portion.

A method of manufacturing a filter assembly for an air purifier is also provided. Such method includes the steps of providing a back plate including a central portion and a pair of end portions, each of the end portions including an angled inner surface extending at an oblique angle with respect to an inner surface of the central portion; providing a pleated HEPA filter of selected length and height and having two ends; providing a flexible, porous metal grid of selected length and height; applying a first adhesive to the angled surfaces of said back plate; causing the filter and metal grid to form a substantially U-shaped assembly wherein the filter adjoins the metal grid; contacting the ends of the filter with the angled surfaces of the back plate such that said ends of the filter stick to said back plate; providing a top wall including an arcuate channel; providing a second adhesive within the channel; applying the top wall to a top portion of the U-shaped assembly; allowing the top wall to bond to the top portion of the U-shaped assembly; providing a bottom wall including an arcuate channel; providing a third adhesive within the channel of the bottom wall; applying the bottom wall to a bottom portion of the U-shaped assembly, and allowing the bottom wall to bond to the bottom portion of the U-shaped assembly. The use of angled surfaces in the end portions of the back plate facilitates the bonding of the filter thereto.

BRIEF DESCRIPTION OF DRAWINGS

FIG. 2 is a top plan view thereof;

FIGS. 3A, 3B and 3C are exploded, perspective views of portions of the air purifier;

FIG. 12 is a top plan view of the bottom wall of the filter assembly; and

FIG. 13 is a sectional view thereof taken along line 13—13 of FIG. 12.

DETAILED DESCRIPTION OF THE INVENTION

Figure 1:
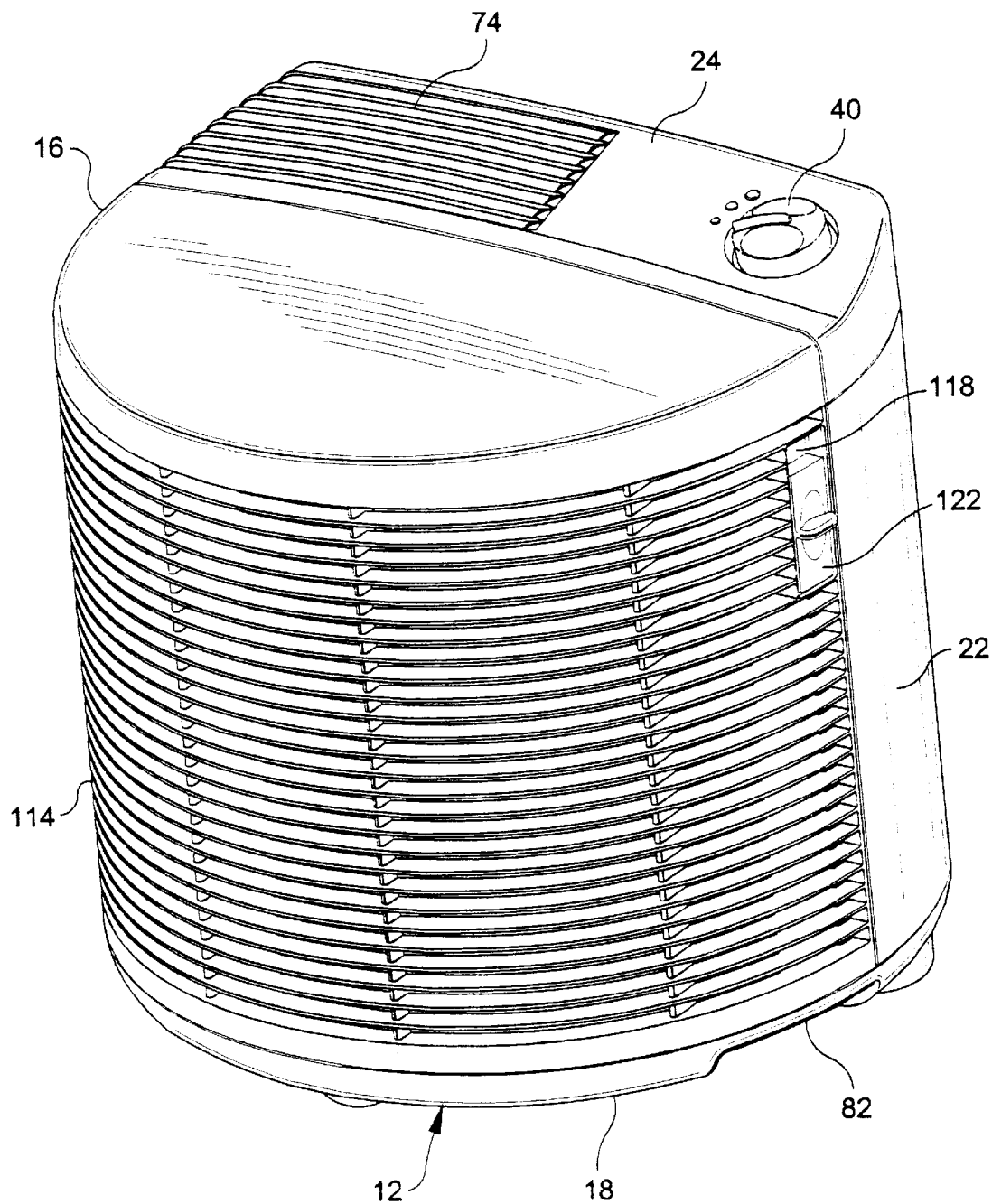
FIG. 1 is a top perspective view of an air purifier according to the invention.

A portable air purifier 10 is provided by the invention. A preferred embodiment thereof is shown in FIGS. 1 and 2. The purifier is comprised of a base assembly 12, a filter assembly 14 and a grill 16. The filter assembly is supported by the base assembly, and is enclosed by the grill.

Referring to the exploded, perspective view of the air purifier shown in FIG. 3, the base assembly 12 is comprised of a base 18, a main frame 20 including a vertical wall 20A and a horizontal platform 20B, a rear housing 22, and a vented control panel 24. All of these components are preferably made from a light weight, durable material such as a rigid plastic. A motor housing 26 extends from the vertical wall 20A of the frame 20. An electric motor 28, which is preferably operable on alternating current, is mounted to the motor housing. The motor housing and motor extend over the horizontal platform 20B of the main frame 20. A "squirrel cage" fan 30 is coupled to the motor by a drive shaft 32. The fan is positioned in an enclosure defined by the base 18, main frame 20 and the rear housing 22, and is rotatable about the longitudinal axis of the drive shaft.

Figure 4:
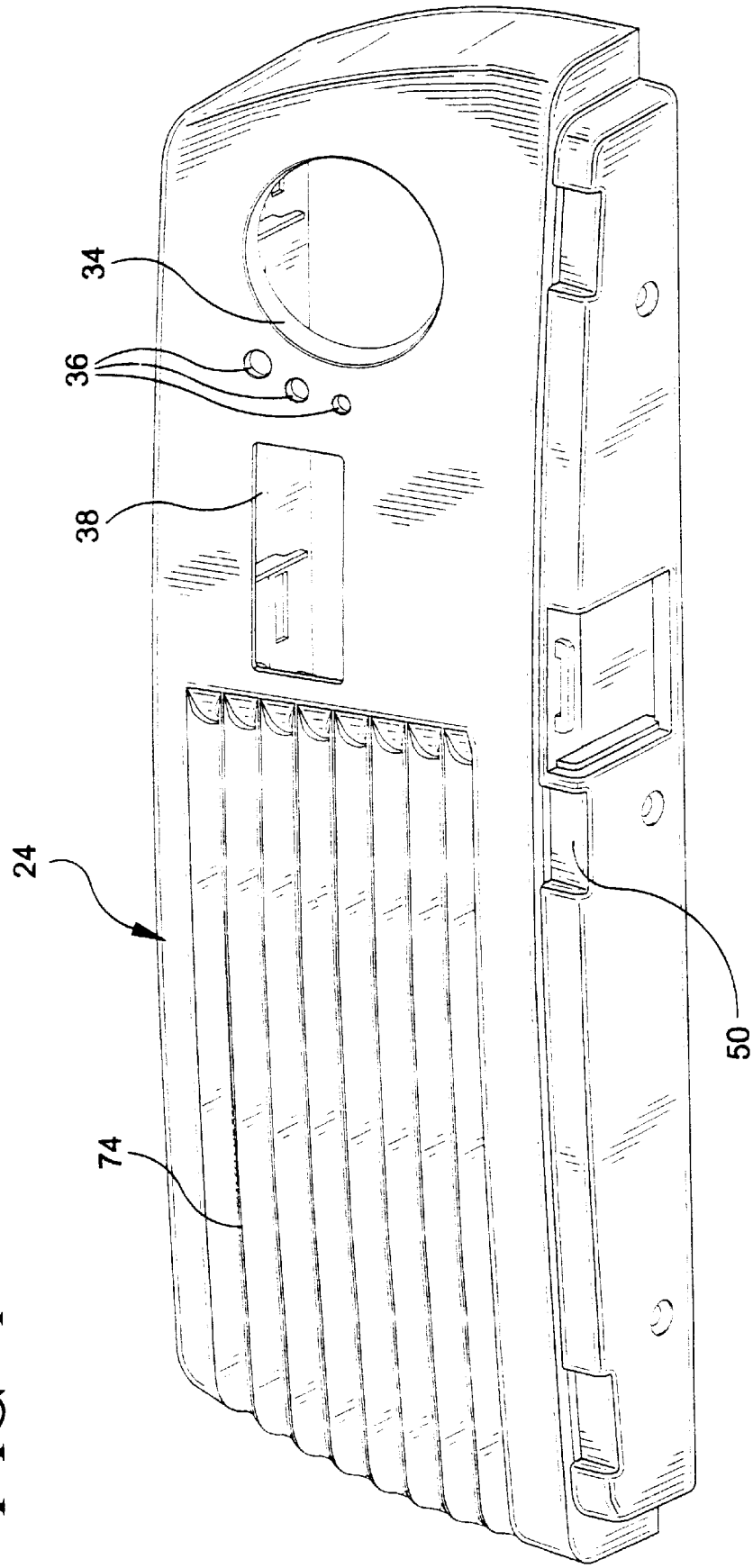
FIG. 4 is a top perspective view of a control panel.

The control panel 24 is secured to the rear housing 22 and the main frame 20. The panel includes a circular opening 34, three small openings 36 and a rectangular opening 38 in the top wall thereof, as shown in FIG. 4. A knob 40 extends through the circular opening, and is used for actuating the motor 28 and controlling fan speed. The knob includes a projection 42 including three neon lights which are positionable beneath the three small openings 36 when the knob is fully turned from the "off" position. A bracket 44 is secured to the top wall of the control panel, and abuts the bottom surface of the knob 40. A rotary switch 46 is secured to the bracket. The knob 40 is coupled to the switch, and is capable of moving the switch to three fan speed positions and an "off" position.

In order to ensure that the fan cannot be operated without the grill 16 in place, a microswitch 48 is provided behind a slot 50 in the front face of the control panel. The microswitch is electrically interconnected with the fan motor 28. The top portion of the grill includes a projection 52 which extends into the slot 50 when the grill is mounted to the base assembly, and engages the microswitch.

The fan is operable when the grill is mounted to the base assembly. The rotary switch is electrically coupled to the motor 28, and is movable between an "off" position and three different "on" positions corresponding to three different fan speeds. All of the lights mounted to the knob are illuminated when this switch is in any of the "on" positions. Only one of the small openings 36 is aligned with any of the lights when the fan is operating at its lowest setting. The lights illuminate all three openings through a lens 54 when the fan is operating at high speed. While the above-described switching and illumination means are preferred, it will be appreciated that slidable switches, toggle switches and other functionally comparable products can be employed. Fewer or greater numbers of fan speeds may also be provided.

Figure 5:
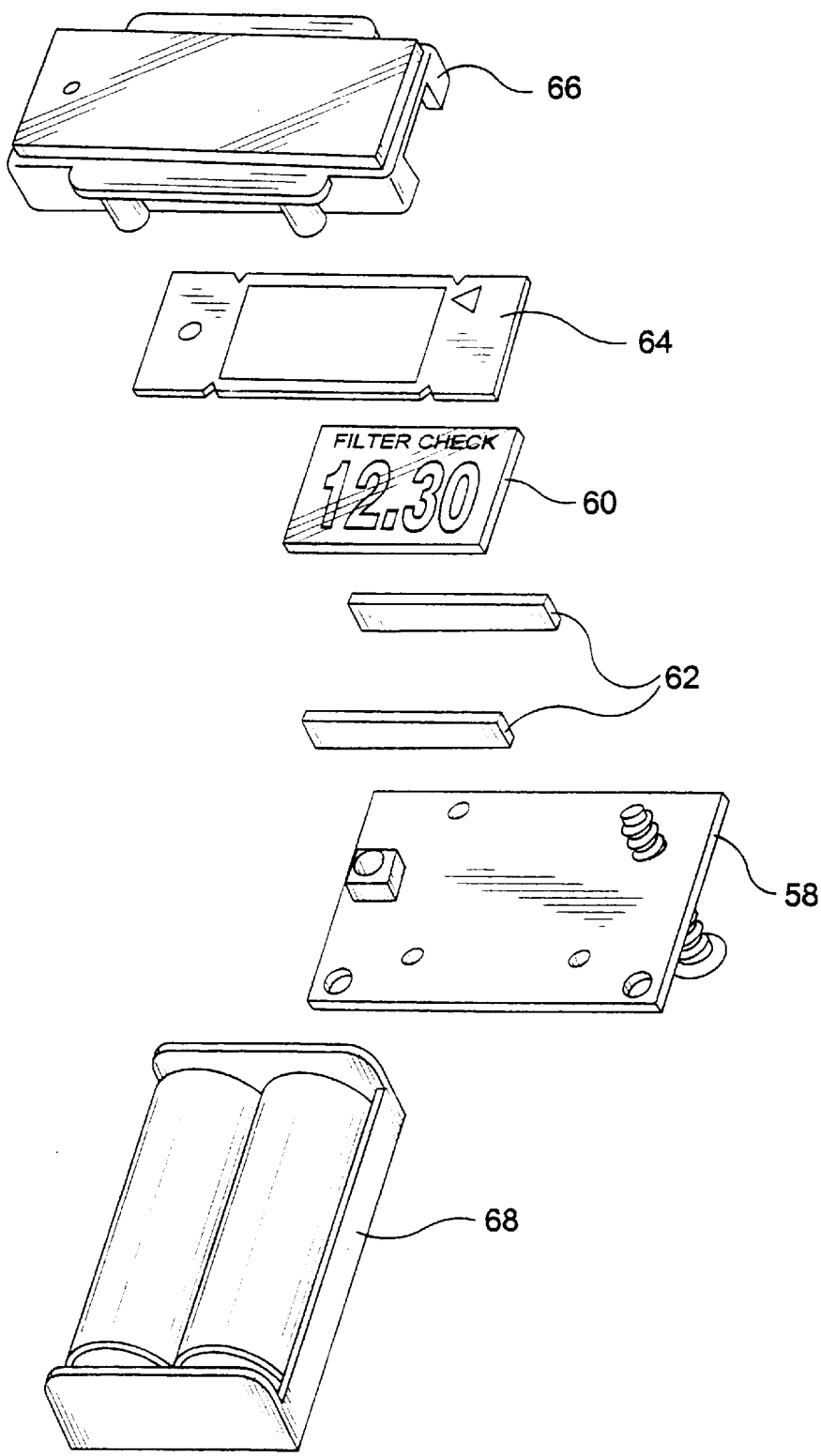
FIG. 5 is an exploded, perspective view of a battery-powered LCD assembly for indicating selected information.
Figure 6:
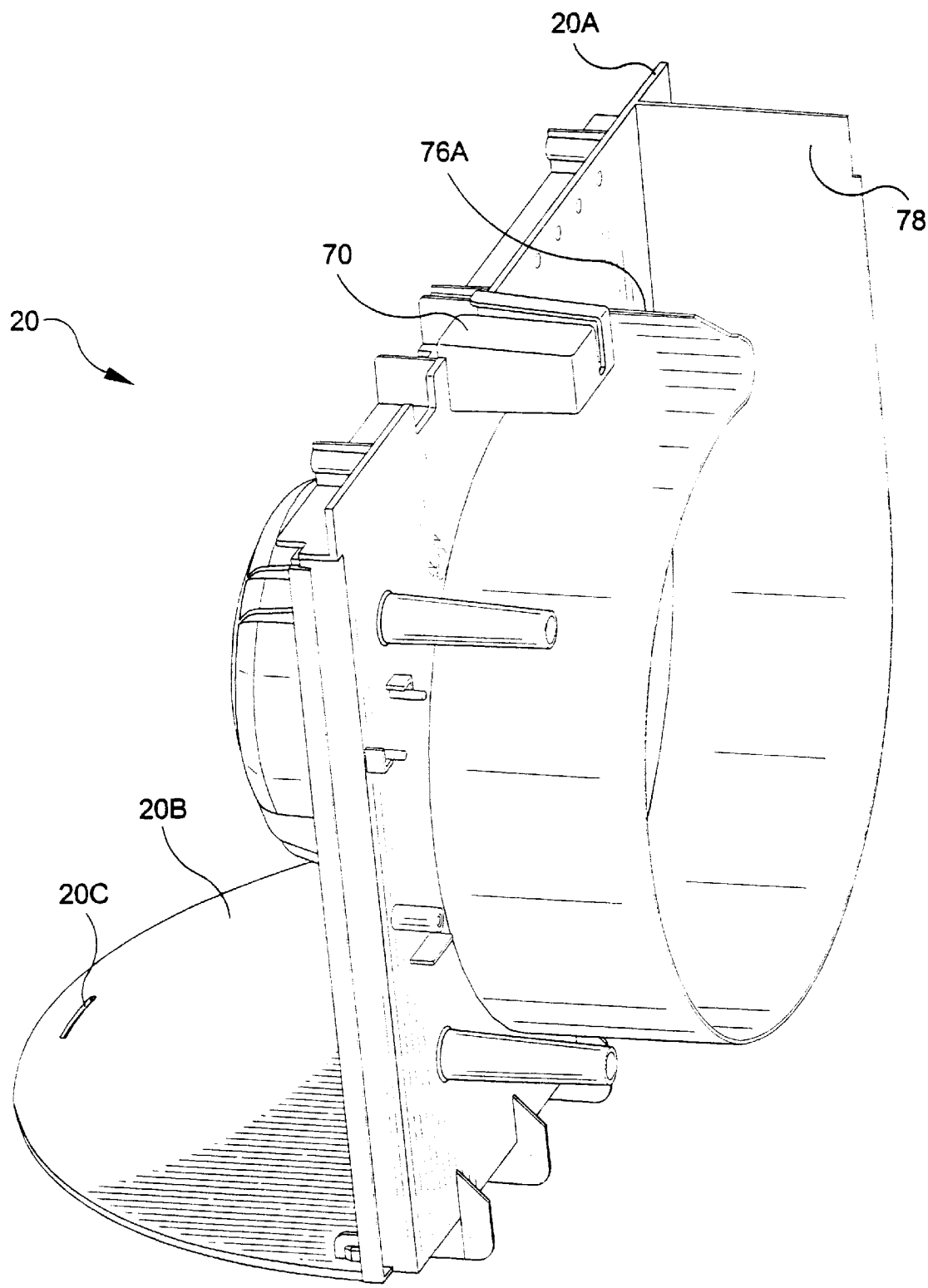
FIG. 6 is a rear perspective view of a main frame and shield of the air purifier.

A battery-powered LCD assembly 56 is also preferably mounted to the control panel 24. It is positioned beneath the rectangular opening 38 in the top wall of the control panel. The LCD assembly includes a printed circuit board 58, a liquid crystal diode 60 supported by conductive rubber strips 62, a label 64, and a lens assembly 66, all as shown in FIG. 5. The assembly 56 provides a display of the time of day, and also indicates after a predetermined number of operating hours that the user should check the condition of the filter. The assembly is powered by a battery pack 68 located in a compartment 70 located in the main frame 20. A door 72 in the control panel 24 allows access to the batteries.

The control panel 24 and main frame 20 are designed to facilitate the flow of air drawn through the filter assembly and into the base assembly. The control panel includes an integral grate 74 defining a plurality of slot-like openings. A partially curved shield 76 extends rearwardly from the vertical wall 20A. The shield adjoins the rear housing 22. An enclosure is accordingly formed by the vertical wall 20A of the main frame, the shield, and the rear housing. The fan 30 is positioned within this enclosure. Two openings are provided in the enclosure. One is a substantially circular opening 78 through the vertical wall 20A. The diameter of this opening is slightly greater than the diameter of the fan as defined by the inner edges of the fan blades. The other opening 80 is that defined by the two ends 76A, 76B of the shield, the vertical wall 20A of the main frame, and the rear wall of the rear housing 22. The grate 74 adjoins this opening, and has generally the same dimensions thereof. The curved portion of the shield extends about two hundred and seventy degrees, i.e., between the twelve and nine o'clock positions. The remaining portion of the shield is substantially vertical, and has an upper edge which is coplanar with the upper edges of the vertical wall 20A and rear housing 22. The fan blades are oriented and rotated such that air is caused to move about the curved portion of the shield and then upwardly towards the upper opening 80 of the fan enclosure.

In order to facilitate the portability of the air purifier, the base 18 includes a pair of indents 82 which function as hand grips. In addition, the components of the system, other than the motor and parts of the filter assembly, are made from plastic. These components are relatively light in weight.

Figure 7:
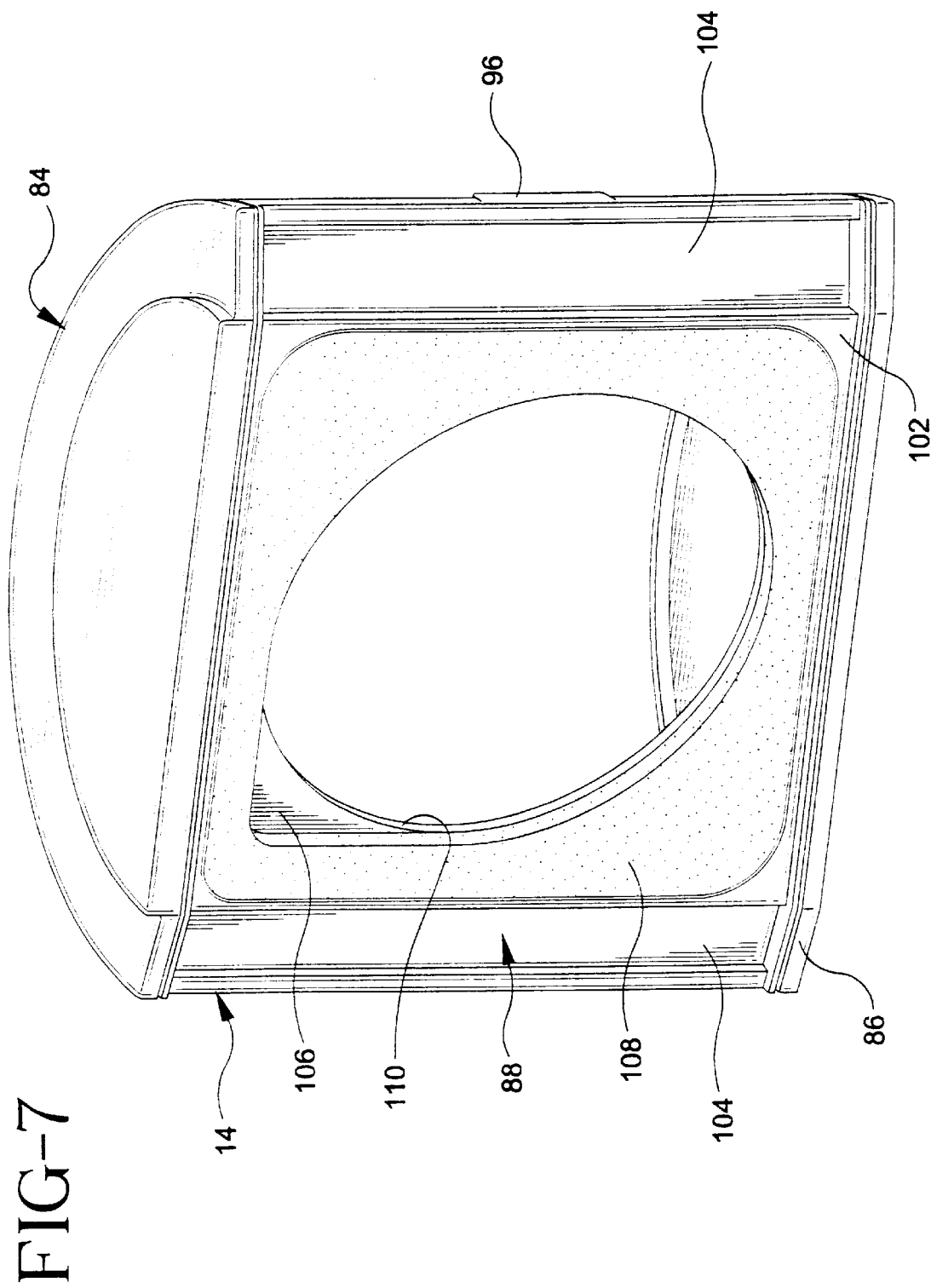
FIG. 7 is a top perspective view of a filter assembly according to the invention.
Figure 8:
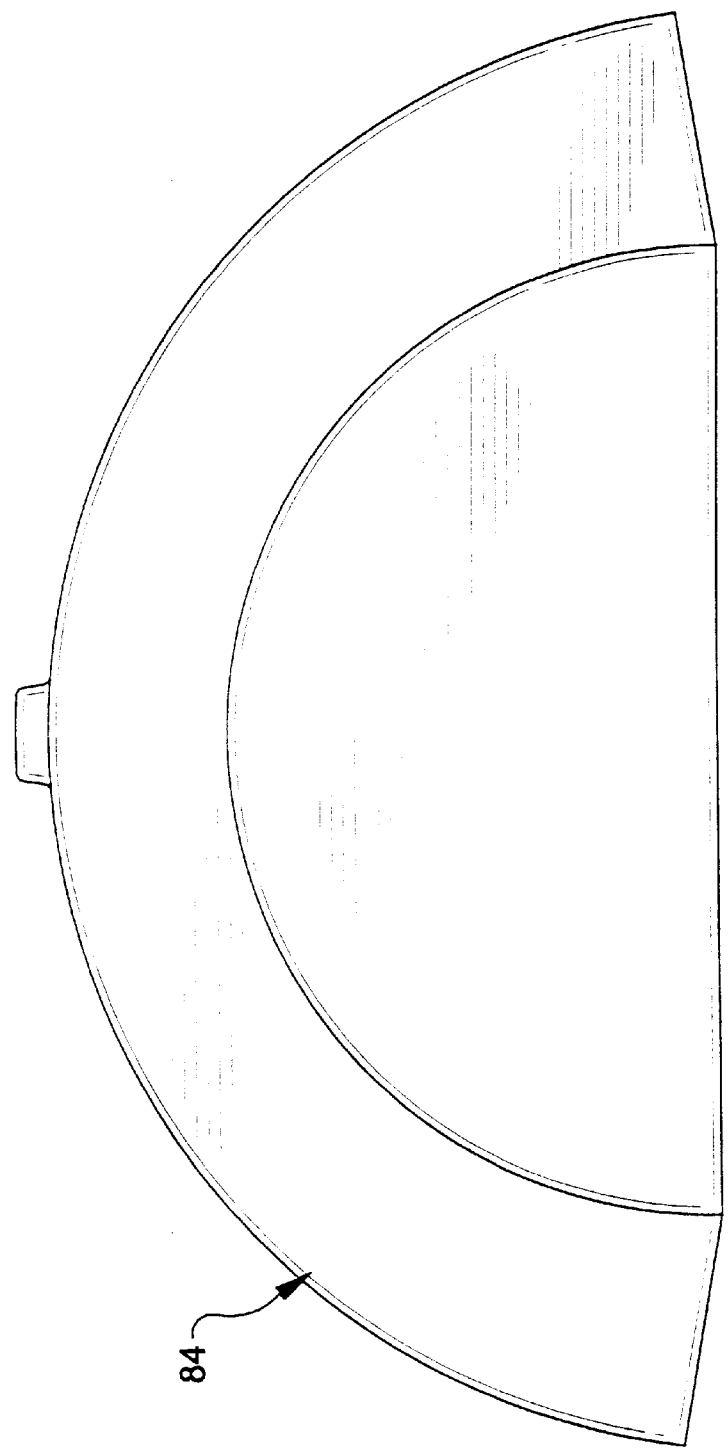
FIG. 8 is a top plan view thereof.
Figure 9:
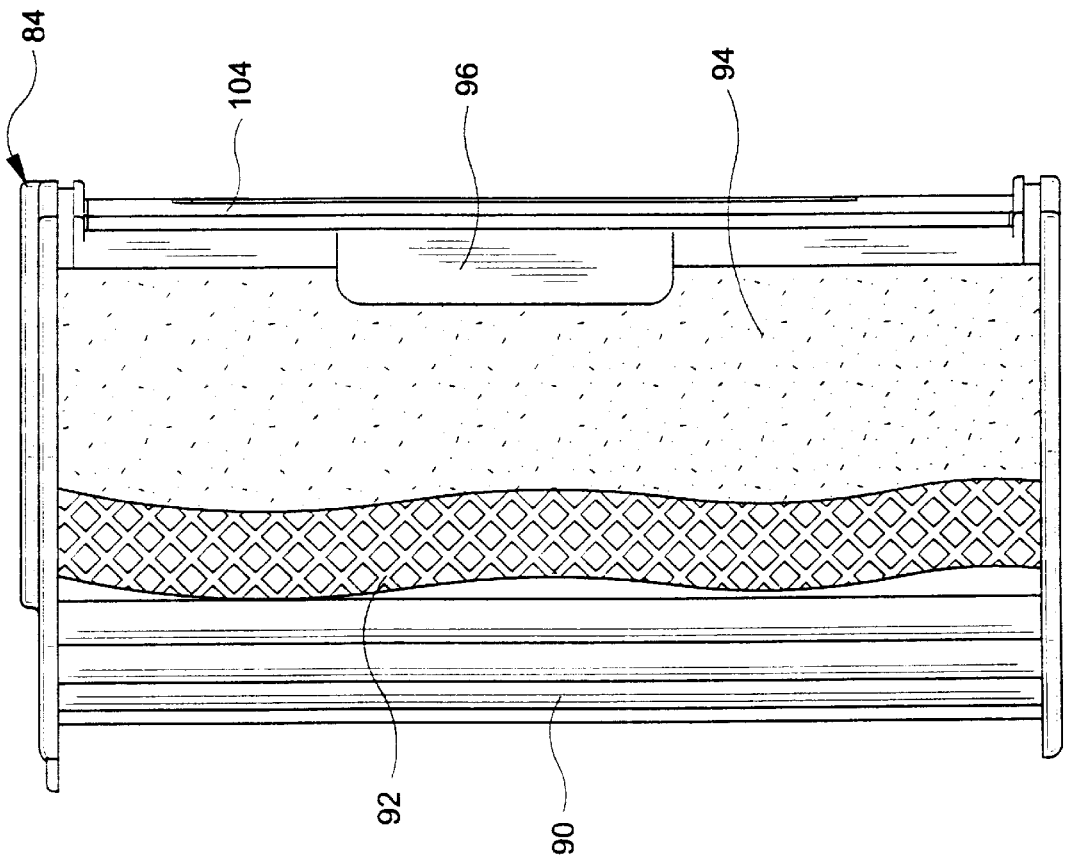
FIG. 9 is a partially cutaway, side elevation view thereof.
Figure 11:
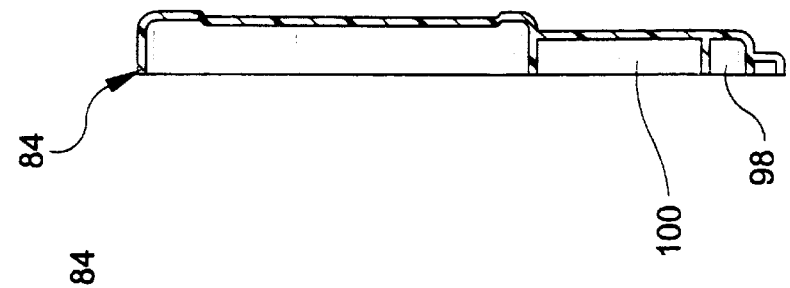
FIG. 11 is a sectional view thereof taken along line 11—11 of FIG. 10.
Figure 10:
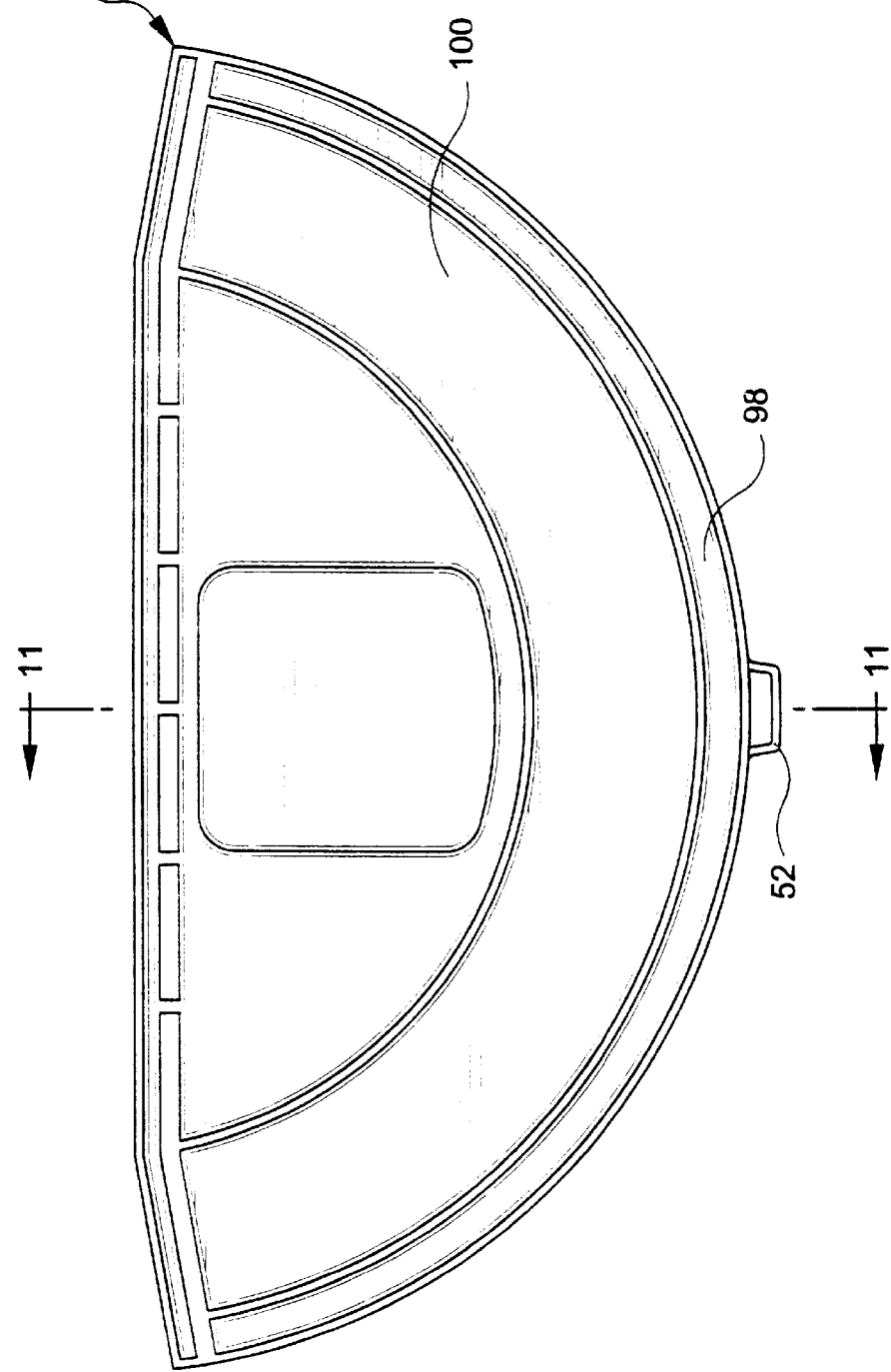
FIG. 10 is a bottom plan view of the top wall of the filter assembly.

The filter assembly 14, as shown in FIGS. 7–9, is comprised of a top wall 84, a bottom wall 86, a back plate 88 adjoining the top and bottom walls, a pleated, high efficiency particulate air (HEPA) filter 90, and a flexible, porous metal grid 92. The metal grid is preferably made from expanded metal. A carbon filter 94 is also preferably included in the assembly, as shown in FIG. 3A. A pair of tabs 96 extend rearwardly from the back plate 88 for retaining the carbon filter against the metal grid.

The top and bottom walls of the filter assembly are generally semicircular in configuration. Each includes a pair of generally semicircular, parallel walls defining a first channel 98, 98A near the arcuate edges thereof A third, generally semicircular wall is located within the inner wall of the first channel. A second, relatively wide channel 100, 100A is defined between these two walls. When installed in the base assembly, the bottom wall 86 snaps behind an arcuate ridge 20C on the horizontal platform 20B of the main frame 20.

The back plate 88 includes a central portion 102 and a pair of end portions 104 extending at oblique angles from opposite sides thereof The edge of the top and bottom walls adjoining the back plate have similar configurations. In the preferred embodiment, angles of about ten degrees are formed between the planes of the central and the end portions. (It will be appreciated that the inner surfaces of the end portions of the back plate should extend at oblique angles with respect to the inner surface of the central portion thereof. It is not necessary for the entire end portions to extend at such angles, other than to facilitate the manufacturing process.) The central portion 102 includes a generally rectangular recess 106. A foam gasket 108 is secured to the recess back wall, and has a thickness which slightly exceeds the depth of the recess. The gasket 108 accordingly bears against the vertical wall 20A of the main frame when the filter assembly is mounted to the base assembly. A circular opening 110 is formed in the recess back wall. This opening is aligned with, and slightly larger than the circular opening 78 in the vertical wall. In a preferred embodiment of the invention, the opening 110 has a diameter of about 6.75 inches. In contrast, the back plate has a height of about 9.5–10 inches and a width of about twelve inches. A horizontal wall 112 extends about the circular opening, and corresponds in dimensions to the opening in the gasket. This wall 112 extends within the gasket 108. The dimensions of the vertical wall 20A of the main frame are approximately the same as those of the back plate 88.

The construction of the back plate 88 of the filter assembly facilitates the manufacture thereof, while still providing a superior seal between the filter and base assemblies. The pleated HEPA filter, and metal grids are cut to size to begin the manufacturing process. Three beads of hot melt glue are laid down on the end portions 104 of the back plate 88 on the sides opposite from the gasket 108. The HEPA filter and metal grid are placed in a U-shaped fixture (not shown). The back plate is placed over the fixture such that the ends of the pleated filter stick to the back plate. A bead of foaming urethane is then laid down on the inner surface of the top wall 84 and within the wide channel 100. The top wall is applied to the partially completed assembly and held in place for several minutes to allow curing of the urethane. The process is repeated when the bottom wall 86 is secured. Finally, the foam gasket 108 is adhered to the back plate. The above sequence of steps is preferred, though not necessarily critical. Affixation of the filter to the back plate should, however, precede affixation of the top and bottom walls. The angled surfaces of the end portions 104 of the back plate greatly facilitate the reliable assembly of the pleated filter, as opposed to back plates having entirely planar surfaces. Less force is required to create intimate contact between the filter and back plate. The "gluing" of the parts is accordingly more easily and reliably achieved. The carbon filter 94 is positioned in adjoining relation to the metal grid with its upper and lower ends in the first channels 98, 98A by either the manufacturer or the consumer.

The grill 16 includes a semicylindrical wall 114 which is substantially comprised of slot-like openings bounded by horizontal slats and vertical posts. It further includes a semicircular top wall 116 including projections 52 which are insertable within corresponding slots 50 in the control panel 24. As discussed above, one of the projections engages a microswitch 48 located behind one of the slots 50 in the control panel 24. Each end of the semicylindrical wall 114 includes an elongate slot 116 defined within a rectangular recess 118. A latch assembly 120 is slidably mounted to each slot such that a body portion 122 thereof is within the recess. Detent members 124 extend through slots (not shown) in the edge portions of the semicylindrical wall. The detent members are engageable with corresponding slots 126 within two vertical rails 20D adjoining the vertical wall 20A of the main frame 20. The latch assemblies are moved upwardly in the recesses 118 to disengage the grill and the main frame 20. Downward movement of the latch assemblies causes the detent members to engage the walls of the vertical rails bordering the lower portions of the slots, thereby locking the grill to the main frame 20. The horizontal wall 20B of the main frame may include a peripheral ridge (not shown) which maintains the bottom portion of the grill in place when mounted to the main frame.

In operation, the knob 40 on the control panel is turned by the user to select the desired fan speed. Rotation of the fan blades causes air to be drawn into the filter assembly through the filters 90, 90A. The filtered air then moves through the openings 110, 78 in the back plate 88 and vertical wall 20A, respectively, and into the enclosure defined in part by the shield 76. The air is caused to move around the arcuate portions of the shield and is upwardly through the opening 80 and grated portion of the control panel 24. Because the openings 110, 78 are substantially smaller in dimension than the back plate and vertical wall, respectively, as well as the area of the filters 90, 94 through which the air is drawn into the air purifier, considerable suction is created between the base assembly and filter assembly. This causes the filter assembly to be drawn towards the base assembly. The gasket 108 accordingly forms a very tight seal between the base and filter assemblies, ensuring that unfiltered air does not bypass the filter assembly prior to entering the enclosure for the fan. The seal becomes even tighter as the fan speed is increased, as the gasket is further compressed against the vertical wall 20A of the main frame 20.

The filters 90, 94 of the air purifier are easily replaced. The carbon filter 94, which is comprised of a nonwoven, rectangular piece of fabric, is simply displaced from the channels 98, 98A in the top and bottom walls of the filter assembly and from behind the tabs 96 extending from the back plate 88. The HEPA filter 90 is replaced with the entire filter assembly 14.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A method of manufacturing a filter assembly for an air purifier, comprising:

providing a back plate including a central portion and a pair of end portions, each of said end portions including an angled surface extending at an oblique angle with respect to said central portion;

providing a pleated HEPA filter of selected length and height and having two ends;

providing a flexible, porous metal grid of selected length and height;

applying a first adhesive to said angled surfaces of said back plate;

causing said filter and metal grid to form a substantially U-shaped assembly wherein said filter adjoins said metal grid;

contacting the ends of said filter with said angled surfaces of said back plate such that said ends of said filter stick to said back plate;

providing a top wall including an arcuate channel;

providing a second adhesive within said channel;

applying said top wall to a top portion of said U-shaped assembly;

allowing said top wall to bond to said top portion of said U-shaped assembly;

providing a bottom wall including an arcuate channel;

providing a third adhesive within said channel of said bottom wall;

applying said bottom wall to a bottom portion of said U-shaped assembly, and allowing said bottom wall to bond to said bottom portion of said U-shaped assembly.

2. A method as described in claim 1 wherein said back plate includes an opening in said central portion, including the step of affixing a gasket having a passage to said central portion such that said passage is aligned with said opening.

3. A method as described in claim 1 wherein said first adhesive is hot melt glue and said second and third adhesives are foaming urethane.

* * * * *